(12) United States Patent
Willis

(10) Patent No.: US 11,135,714 B1
(45) Date of Patent: Oct. 5, 2021

(54) HOLDER FOR KNIVES AND TOOLS

(71) Applicant: William Montague Willis, Blue Jay, CA (US)

(72) Inventor: William Montague Willis, Blue Jay, CA (US)

(*) Notice: Subject to any disclaimer, the term of this patent is extended or adjusted under 35 U.S.C. 154(b) by 0 days.

(21) Appl. No.: 17/249,881

(22) Filed: Mar. 17, 2021

(51) Int. Cl.
*B25H 3/04* (2006.01)
*A47G 21/14* (2006.01)
*B65D 25/10* (2006.01)
*A47F 7/00* (2006.01)
*F16B 47/00* (2006.01)

(52) U.S. Cl.
CPC .............. *B25H 3/04* (2013.01); *A47F 7/0021* (2013.01); *A47G 21/14* (2013.01); *B65D 25/101* (2013.01); *F16B 47/00* (2013.01); *Y10T 24/44897* (2015.01)

(58) Field of Classification Search
CPC ......... B25H 3/04; A47G 21/14; A47F 7/0021; B65D 25/10; B65D 25/101; Y10T 24/44897; Y10T 428/24157; F16B 47/00
See application file for complete search history.

(56) References Cited

U.S. PATENT DOCUMENTS

| | | | | |
|---|---|---|---|---|
| 840,558 A * | 1/1907 | Denmead | ............. | B65D 85/321 217/35 |
| 2,057,972 A * | 10/1936 | Pieck | ............. | A47G 19/30 47/71 |
| 2,636,615 A | 4/1953 | Bradley | | |
| 2,899,077 A | 8/1959 | Timms | | |
| 3,176,504 A * | 4/1965 | Shapiro | ............. | B01L 9/06 211/70.1 |
| 3,182,808 A | 5/1965 | Benoit et al. | | |
| 4,423,552 A * | 1/1984 | Bourgein | ............. | A47G 21/14 248/37.3 |
| 4,924,597 A * | 5/1990 | Tursi | ............. | G01B 5/0002 33/758 |
| 5,474,206 A * | 12/1995 | Herring, Sr. | ............. | A47J 43/0727 220/630 |
| 5,515,969 A | 5/1996 | Schonenbach | | |
| 5,738,228 A | 4/1998 | Bittinger | | |
| 6,082,559 A | 7/2000 | Levsen | | |
| 6,439,403 B1 | 8/2002 | Levsen | | |
| 6,502,711 B1 * | 1/2003 | Mc Rae | ............. | B65D 21/0204 211/71.01 |
| 6,685,034 B1 | 2/2004 | Cooke | | |
| 7,018,588 B2 * | 3/2006 | DeSilets | ............. | B01L 3/5025 422/534 |

(Continued)

*Primary Examiner* — Ko H Chan
(74) *Attorney, Agent, or Firm* — Knobbe, Martens, Olson & Bear LLP

(57) ABSTRACT

A holder for knives or tools includes a vessel of an elastic material that has a chamber. Linear bristles fill and are arranged in adjacent rows within the chamber so that the vessel exerts a compression force on the linear bristles. Each bristle has a generally rectangular cross-section transverse to a length of the bristle. The linear bristles receive and retain knives or tools via a friction force irrespective of the orientation of the knives or tools when inserted into the vessel and irrespective of the orientation of the vessel. The holder assembly can include a suction cup via which the vessel can be coupled to a surface, and a base plate that receives the suction cup for mounting to different (e.g., uneven, non-smooth) surfaces.

21 Claims, 16 Drawing Sheets

(56) References Cited

U.S. PATENT DOCUMENTS

| | | | |
|---|---|---|---|
| 7,303,493 B1 * | 12/2007 | Ehresman | A63B 57/15 |
| | | | 473/386 |
| 7,458,474 B2 | 12/2008 | Bewsky | |
| 8,905,825 B2 | 12/2014 | Huff | |
| 9,801,483 B2 * | 10/2017 | D'Alesio | F16B 47/00 |
| 10,299,556 B1 | 5/2019 | Reyes | |
| 10,390,661 B1 | 8/2019 | Steingraber et al. | |
| 2006/0151409 A1 * | 7/2006 | Schmoelzer | B25H 3/04 |
| | | | 211/85.9 |
| 2006/0218798 A1 | 10/2006 | Chen | |
| 2013/0037501 A1 * | 2/2013 | Schmidt | A47G 21/14 |
| | | | 211/70.7 |
| 2016/0367055 A1 * | 12/2016 | Rausch | A47G 21/14 |

* cited by examiner

US 11,135,714 B1

HOLDER FOR KNIVES AND TOOLS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to holders for knives and tools, and more particularly to a holder for knives and tools that can retain knives even if upside down and allow for mounting of the holder on various surfaces.

Description of the Related Art

Existing knife blocks retain knives under gravity, so that if the block falls or is knocked down, the knives can fall out of the block. Additionally, knife blocks are usually placed on top of a counter or other horizontal surface and cannot be mounted in other orientations.

SUMMARY

In accordance with one aspect of the disclosure, an improved holder for knives and tools is provided that retains (under friction) the knives and tools even if the holder is mounted upside down.

In another accordance with another aspect of the disclosure, an improved holder for knives and tools is provided that allows the holder to be mounted to a variety of surfaces and in a variety of orientations. In one example, the holder can be mounted to a smooth surface (e.g., a surface of a refrigerator). In another example, the holder can be mounted to a surface (e.g., uneven surface) via a base plate or bracket (e.g., via fasteners, such as screws). In another example, the holder can be mounted in any orientation, such as to a top surface (e.g., of a counter) right-side up, to a side surface (e.g., of a cabinet) or to a bottom surface (e.g., of a counter, or cabinet) upside down.

In accordance with another aspect of the disclosure, a holder assembly for knives and tools is provided. The holder assembly has a housing comprising a vessel comprising an elastic material and having a chamber extending between an open end and a closed end, and a suction cup extending from an underside of the vessel below the closed end of the vessel. The holder assembly also comprises a bristle retaining tray disposed and retained in the chamber proximate the closed end of the vessel. A plurality of linear bristles are disposed in the chamber and arranged within the chamber so that the plurality of linear bristles fill the chamber and so that the vessel exerts a compression force on the plurality of linear bristles. Each bristle has a first end coupled to the bristle retaining tray, a second rounded end at or near the open end of the vessel, and a generally rectangular cross-section transverse to a length of the bristle. The holder assembly also comprises a base plate having a slot configured to removably receive the suction cup of the housing to at least partially couple the housing to the base plate, a retention block configured to fit in the slot and to engage one or both of an underside of the vessel and the suction cup, and a locking member coupled to the base plate and operable to retain the retention block in the slot of the base plate. The plurality of linear bristles are configured to receive and retain one or more knives or tools via a friction force irrespective of the orientation of the one or more knives or tools when inserted between the bristles in the vessel and irrespective of an orientation of the housing.

In accordance with another aspect of the disclosure, a holder assembly for knives and tools is provided. The holder assembly has a housing comprising a vessel comprising an elastic material and having a chamber extending between an open end and a closed end, and a suction cup extending from an underside of the vessel below the closed end of the vessel. The holder assembly also comprises a plurality of linear bristles disposed in the chamber and arranged within the chamber so that the plurality of linear bristles fill the chamber and so that the vessel exerts a compression force on the plurality of linear bristles. Each bristle having a generally rectangular cross-section transverse to a length of the bristle. The plurality of linear bristles are configured to receive and retain one or more knives or tools via a friction force irrespective of an orientation of the one or more knives or tools when inserted in the vessel and irrespective of an orientation of the housing.

DETAILED DESCRIPTION

Figure 1:
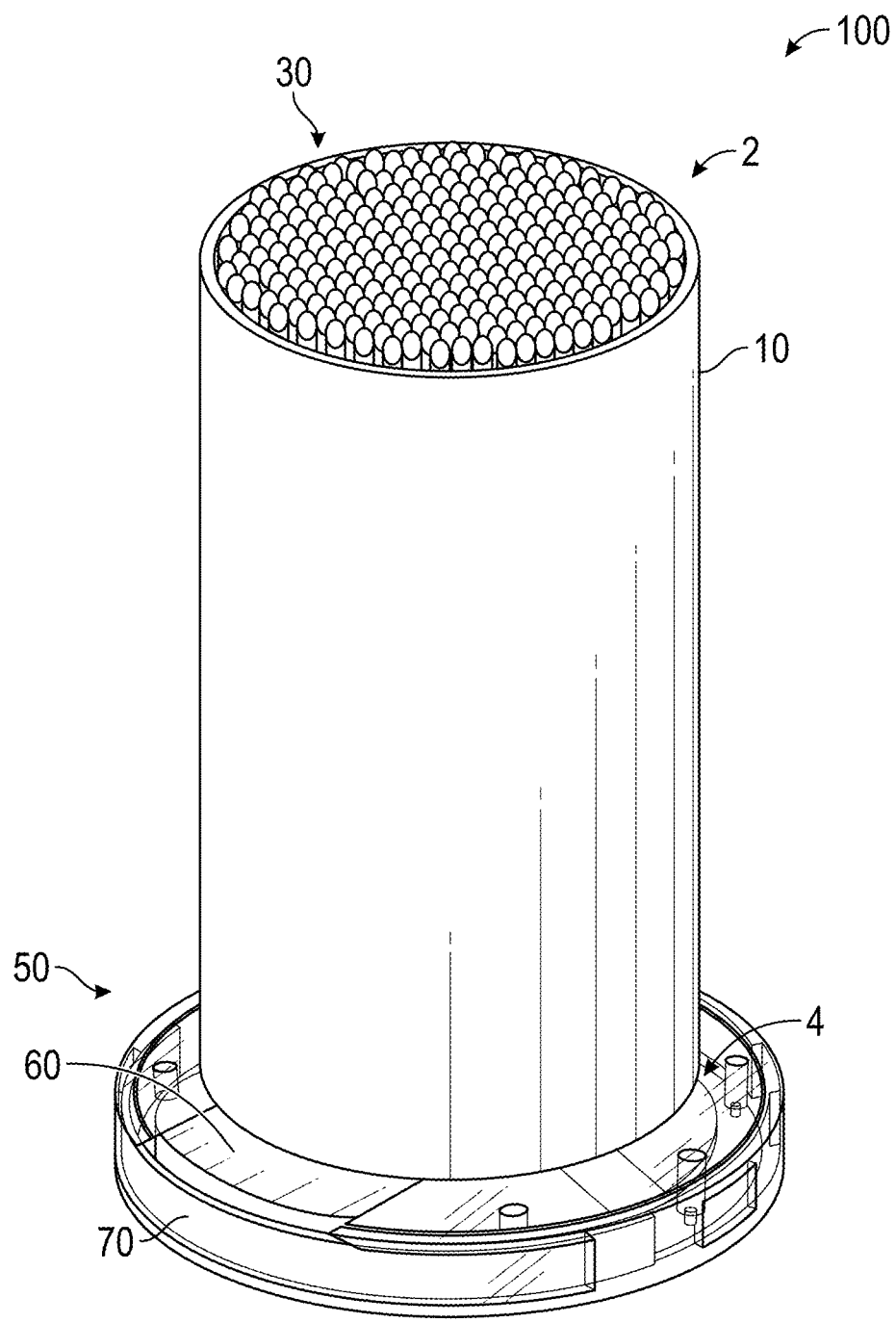
FIG. 1 is a perspective view of a holder assembly for knives and tools.
Figure 2:
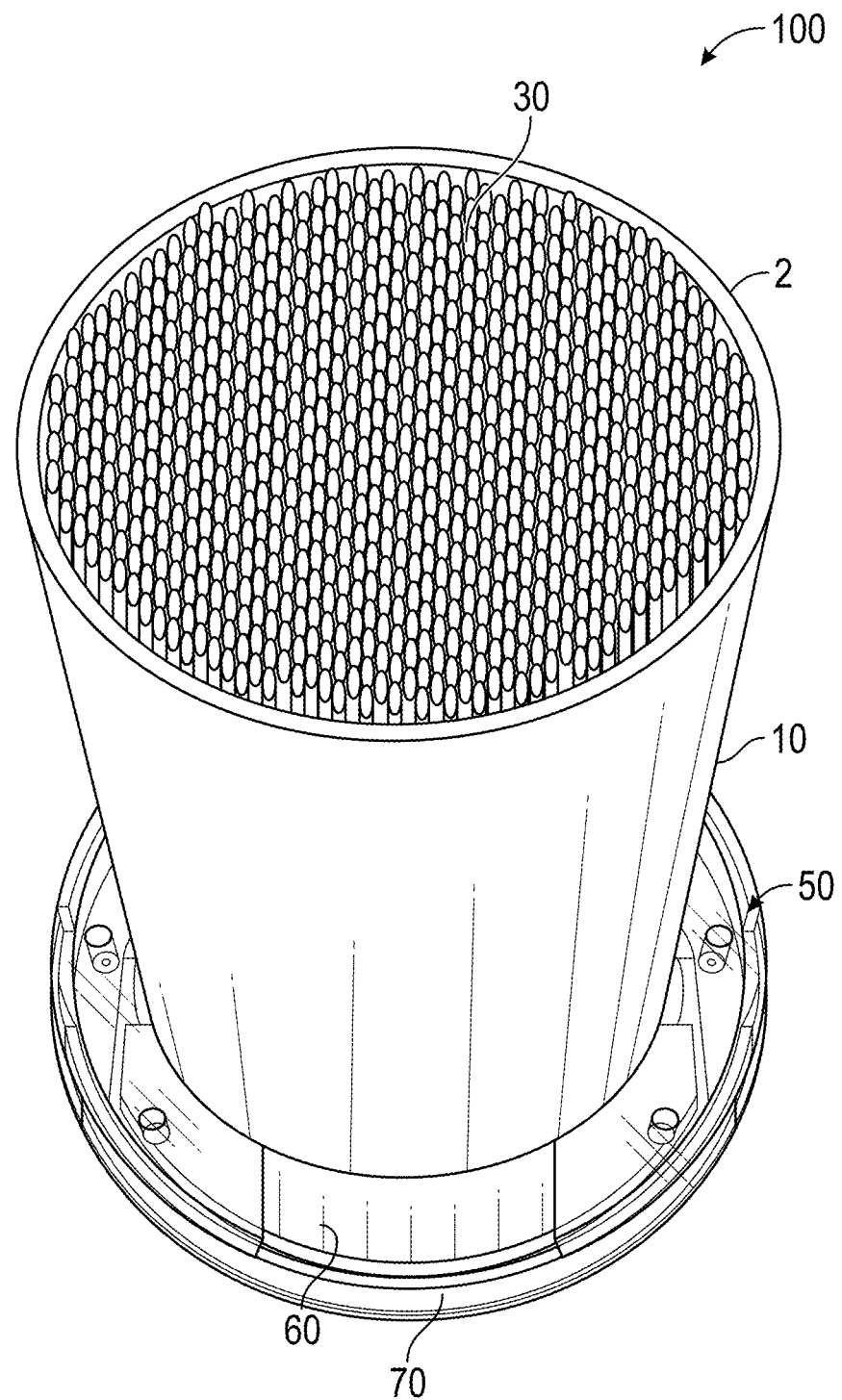
FIG. 2 is a top perspective view of the holder assembly of FIG. 1.
Figure 3:
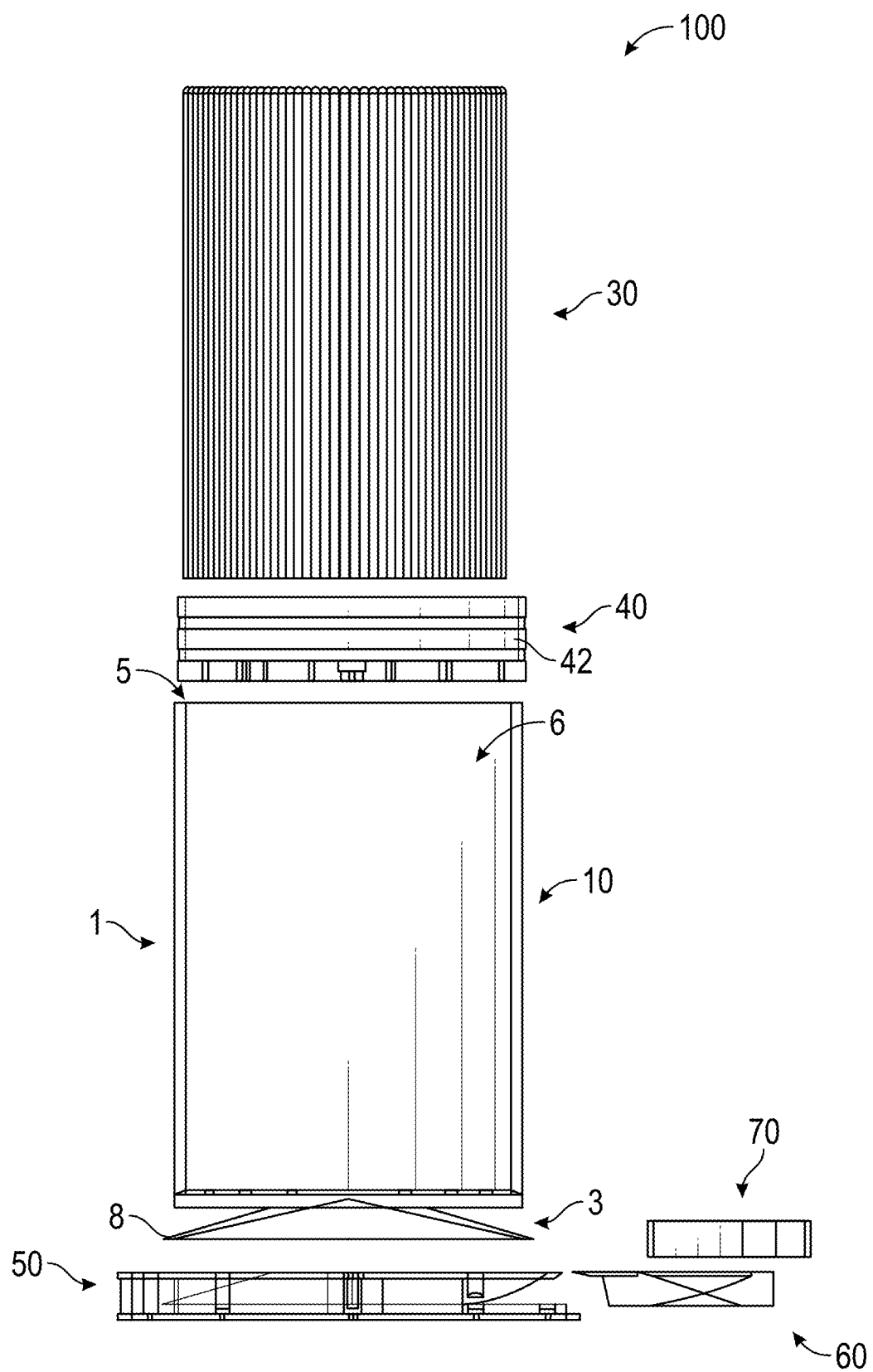
FIG. 3 is an exploded view of the holder assembly of FIG. 1

FIGS. 1-3 illustrate one implementation of a holder assembly 100 for receiving and retaining (e.g., storing) one or more knives. The holder assembly 100 can be used to receive and retain tools (e.g., flathead screwdrivers, paint brushes, chisels) that have a linear member (e.g., having a flat surface).

The holder assembly 100 includes a housing 1 with a vessel 10, a plurality of bristles 30, a bristle retaining tray 40, a base plate 50, a retention block 60 and a locking member 70. In some implementations, as discussed further below, the base plate 50, retention block 60 and locking member 70 can be excluded. In some implementations, the bristle retaining tray 40 can be excluded.

The vessel 10 can extend from a top end 2 to a bottom end 4 and have a chamber 6 that extends between an opening 5 at the top end 2 to a base wall 7. The vessel 10 can be made of an elastic material (e.g., material that can stretch). In one implementation, the vessel 10 can be made of silicone. However, the vessel 10 can be made of other elastic materials (e.g., rubber, synthetic rubber, other elastomers). FIGS. 1-3 show the vessel 10 as having a cylindrical shape (e.g., with an annular or circular cross-section). The peripheral wall 11 of the vessel 10 has an inner diameter (e.g., equivalent diameter) ID (e.g., when the chamber 6 is empty). In other implementations, the vessel 10 can have other suitable form factors (e.g., rectangular or square cross-section, oval cross-section). In the illustrated implementation, the vessel 10 is a single piece (e.g., monolithic, seamless) between a bottom surface 3 at the bottom end 4 to the opening 5 at the top end 2. In other implementations, the vessel 10 can be defined by two or more separate portions that are arranged proximate (e.g., adjacent to, in contact with) each other.

Figure 4:
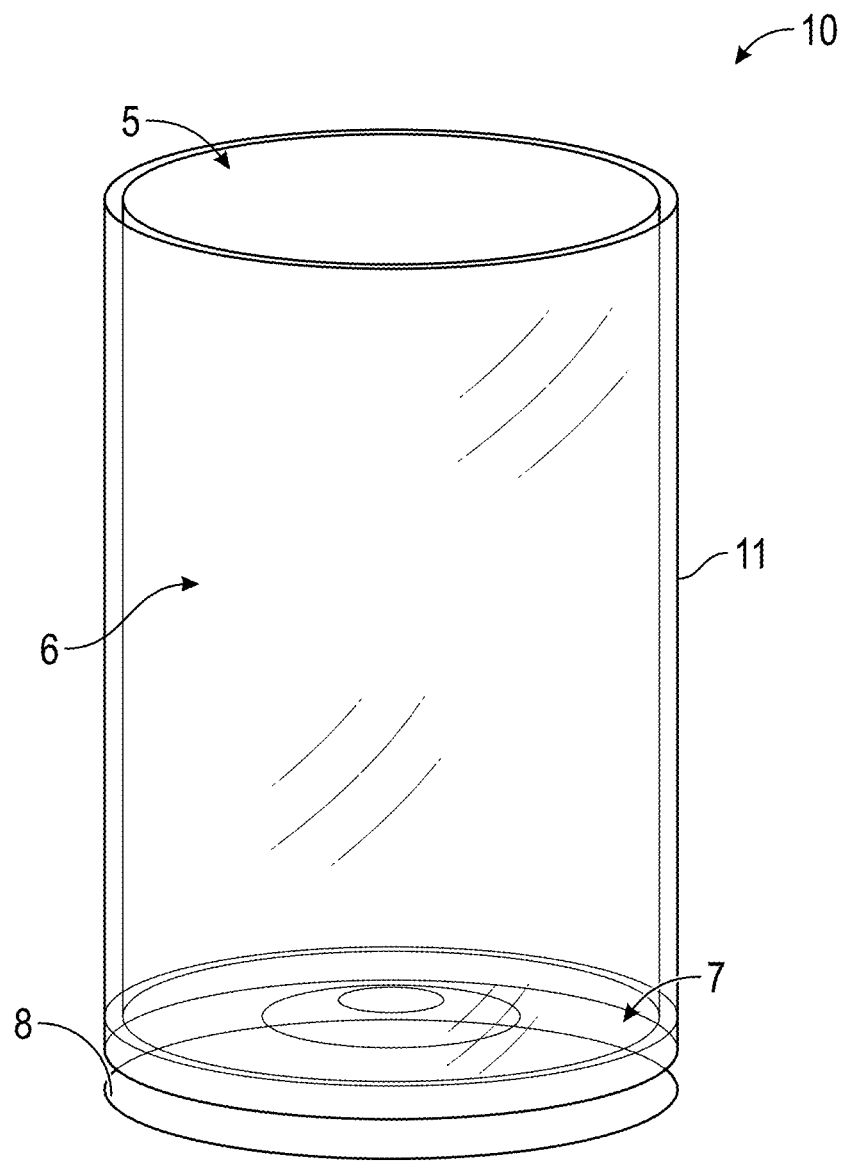
FIG. 4 is a top perspective view of a housing of the holder assembly of FIG. 1.

As shown in FIGS. 3-4, the housing 1 also includes a suction cup 8 attached to a bottom surface 3 of the vessel 10. In one implementation, the vessel 10 and suction cup 8 are a single piece (e.g., monolithic, seamless). In another implementation, the suction cup 8 can be attached to the bottom surface 3 of the vessel 10. The suction cup 8 can be made of a resilient (e.g., elastic) material and have a triangular profile (as shown in FIG. 3). The suction cup 8 can be centered on (e.g., centered along) a central axis (e.g., axis of symmetry) of the vessel 10.

Figure 5:
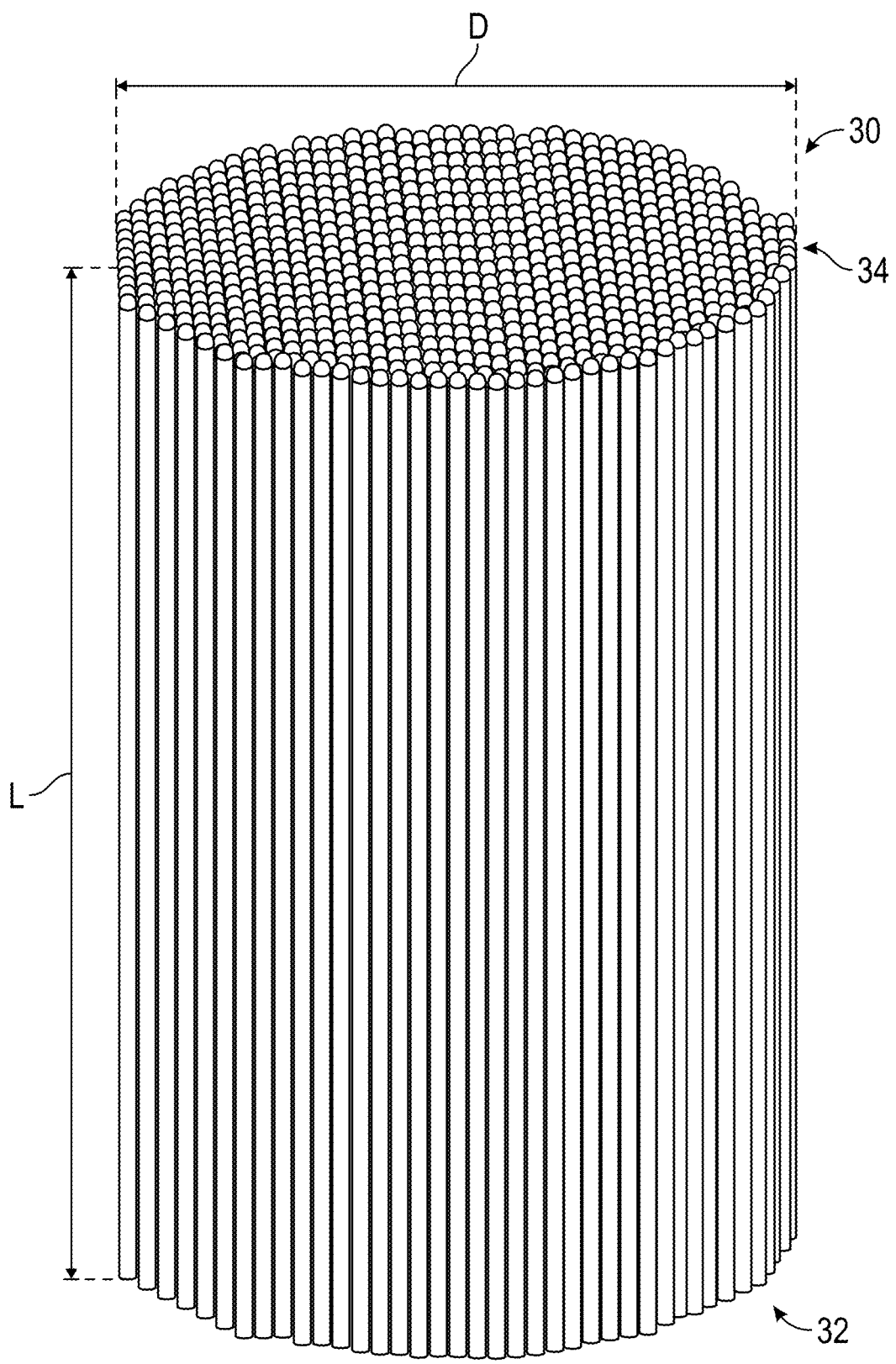
FIG. 5 is a top perspective view of bristles of the holder assembly of FIG. 1.
Figure 12:
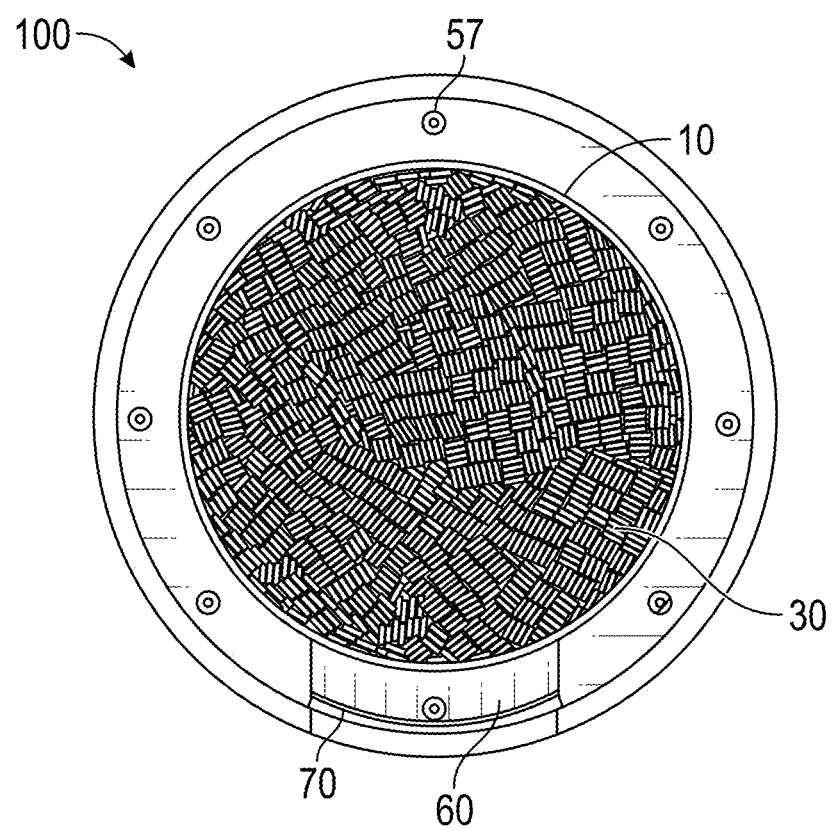
FIG. 12 shows a top view of a holder assembly with bristles having random orientations.

With reference to FIGS. 2-5B, the plurality of bristles 30 are disposed in the chamber 6 of the vessel 10. In one implementation, the plurality of bristles 30 can be arranged in parallel rows (see FIG. 2). In another implementation (see FIG. 12), the plurality of bristles 30 in the chamber 6 of the holder assembly 100 can be randomly oriented (e.g., not arranged in linearly adjacent rows). The plurality of bristles 30 can extend from a bottom end 32 to a top end 34, extend along a length L, and together define a diameter or equivalent diameter D, as shown in FIG. 5. Advantageously, the diameter D is larger than the inner diameter ID of the peripheral wall 11, such that when the plurality of bristles 30 are inserted into the chamber, the difference between the diameter D and inner diameter ID of the peripheral wall 11 results in a compression force applied by the peripheral wall 11 on the bristles 30 (e.g., a compression force directed radially toward the center of the plurality of bristles 30). The bristles 30 can in one implementation be made of a hard plastic material. In another implementation, the bristles 30 can be made of carbon fiber. Other suitable materials can be used.

Figure 5A:
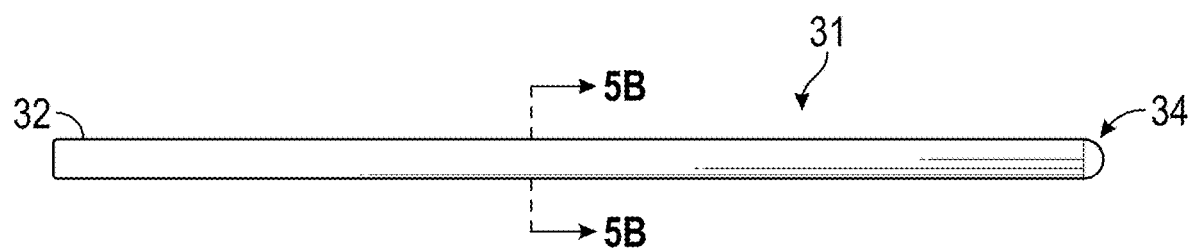
FIG. 5A is a side view of one bristle of the bristles of the holder assembly in FIG. 1.

FIG. 5A shows one bristle 31 of the plurality of bristles 30. The bristle 31 can extend between the bottom end 32 and the top end 34. The bristle 31 can extend substantially linearly (e.g., along an axis). In one implementation, the bottom end 32 can have a flat surface or linear edge. In one implementation, the top end 34 can have a curved surface. In one example, the curved surface can be a rounded surface (e.g., defined by a radius of curvature). The curved or rounded surface can advantageously facilitate the insertion of knives or tools in the chamber 6 by guiding the knives or tools between bristles 30. For example, if a knife edge contacts the curved or rounded end of a bristle 31, the rounded or curved end would cause the knife edge to slide off the end of the bristle 31 and continue moving forward between adjacent bristles 31.

Figure 5B:
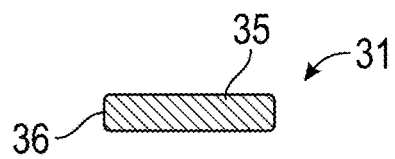
FIG. 5B shows a cross-section of a bristle of the holder assembly perpendicular to its length.

FIG. 5B shows a cross-section of the bristle 31 perpendicular to its length (e.g., to its longitudinal axis). Advantageously, the bristle 31 has a generally rectangular cross-section (e.g., rectangular with rounded edges, rectangular with sharp edges), having a first pair of side surfaces 35 and a second pair of side surfaces 36. The first side surface 35 is wider than the second side surface 36. In one implementation, a ratio of the width of the first side surface 35 to the second side surface 36 is between about 2 to 1 to about 3 to 1. In one example, the width of the first side surface 35 can be approximately 4 mm and the width of the second side surface 36 can be approximately 1.5 mm. As discussed further below, the rectangular cross-section of the bristles 30 advantageously allows for greater surface contact (and therefore greater friction force) between the knives or tools and the bristles 30 (e.g., as compared with bristles having a circular cross-section transverse to their length). In one implementation, one or both of the side surfaces 35, 36 can be smooth. In another implementation, one or both of the side surfaces 35, 36 can be rough or have a texture.

Figure 6:
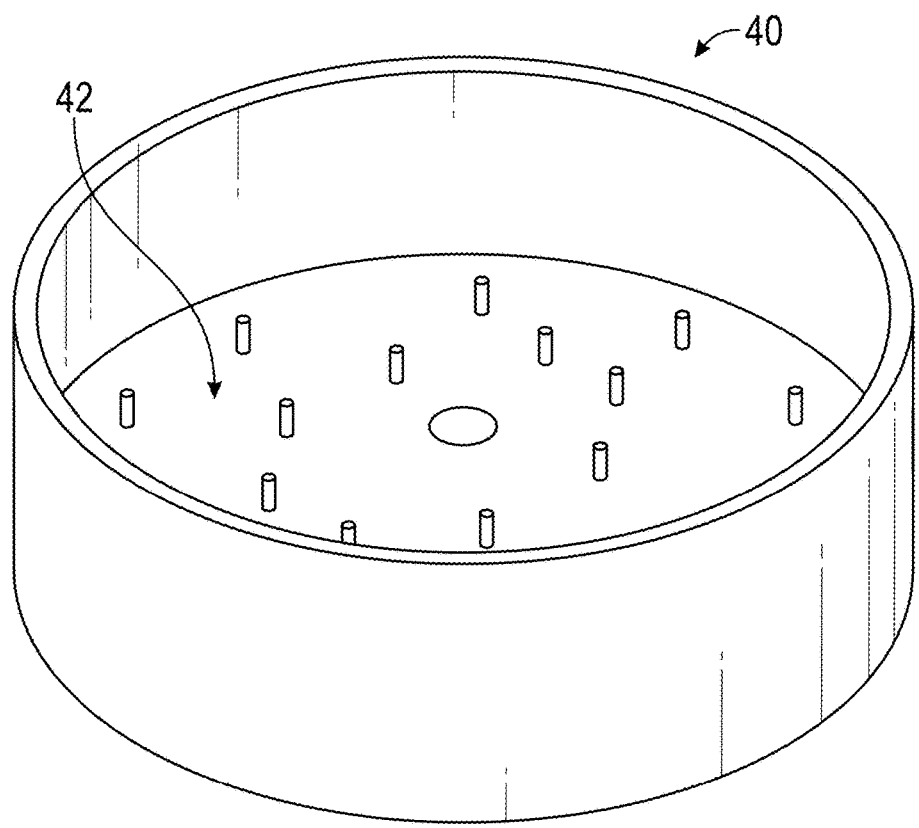
FIG. 6 is a top perspective view of bristle retaining tray of FIG. 1.

FIG. 6 shows a perspective view of the bristle retaining tray 40 (e.g., "the tray 40"). The tray 40 has a chamber or cavity 42 that receives the bottom end 32 of the bristles 30. In one implementation, the bottom end 32 of the bristles 30 are attached to the tray 40 (e.g., to a surface of the tray 40). In one example, the bristles 30 (e.g., bottom end 32 of the bristles 30) are attached to the tray 40 (e.g., within the chamber 42 of the tray 40) with an adhesive. For example, the adhesive can be an epoxy resin. Other suitable adhesives can be used. In other implementations, the bristles 30 can be attached to the tray 40 with other suitable mechanisms. In the illustrated embodiment, the tray 40 has a peripheral wall that can be a cylindrical wall with an outer diameter OD. The outer diameter OD can be larger than the inner diameter ID of the wall peripheral wall 11 of the vessel 10, such that the peripheral wall 11 exerts a compression force on the tray 40 (e.g., to facilitate retaining the tray 40 in the vessel 10 and inhibit or prevent the tray 40 from falling out of the vessel 10). The tray 40 can be inserted into the chamber 6 of the vessel 10. Optionally, the tray 40 can be positioned proximate (e.g., adjacent to, near or next to) the bottom of the chamber 6, such as proximate the base wall 7.

In some implementations, the holder assembly 100 can include the housing 1 with the vessel 10 and suction cup 8, plurality of bristles 30 and optionally include the tray 40. In such implementations, the holder assembly 100 excludes the base plate 50, retention block 60 and locking member 70. The suction cup 8 allows the holder assembly 100 to be attached to smooth surfaces (e.g., a kitchen counter, refrigerator), and/or even surfaces, and held in place by the suction force provided by the suction cup 8. The holder assembly 100 can be oriented in an upright position (e.g., attached on top of a horizontal surface), oriented generally sideways (e.g., attached to a side surface of a refrigerator) or oriented upside down (e.g., attached to a bottom surface of a cabinet or counter). Advantageously, the bristles 30 retain one or more (e.g., multiple) knives or tools (e.g., paint brushes, screwdrivers, chisels) in place via a compression force exerted by the peripheral wall 11 of the vessel 10 onto the bristles 30, which in turn exert a compression force onto the knives or tools, and/or via a friction force between the side surfaces 35, 36 of the bristles 30 and knives or tools. The compression and/or friction force retain the knives or tools in place in the vessel 10 even if oriented upside-down. Advantageously, the more knives or tools are inserted into the vessel 10, the higher the compression force exerted by the peripheral wall 11 on the bristles 30 and in turn on the knives or tools, such that insertion of more knives or tools increases the retention forces (e.g., compression force, friction force) applied on the knives or tools, rather than decreasing it.

Figure 7:
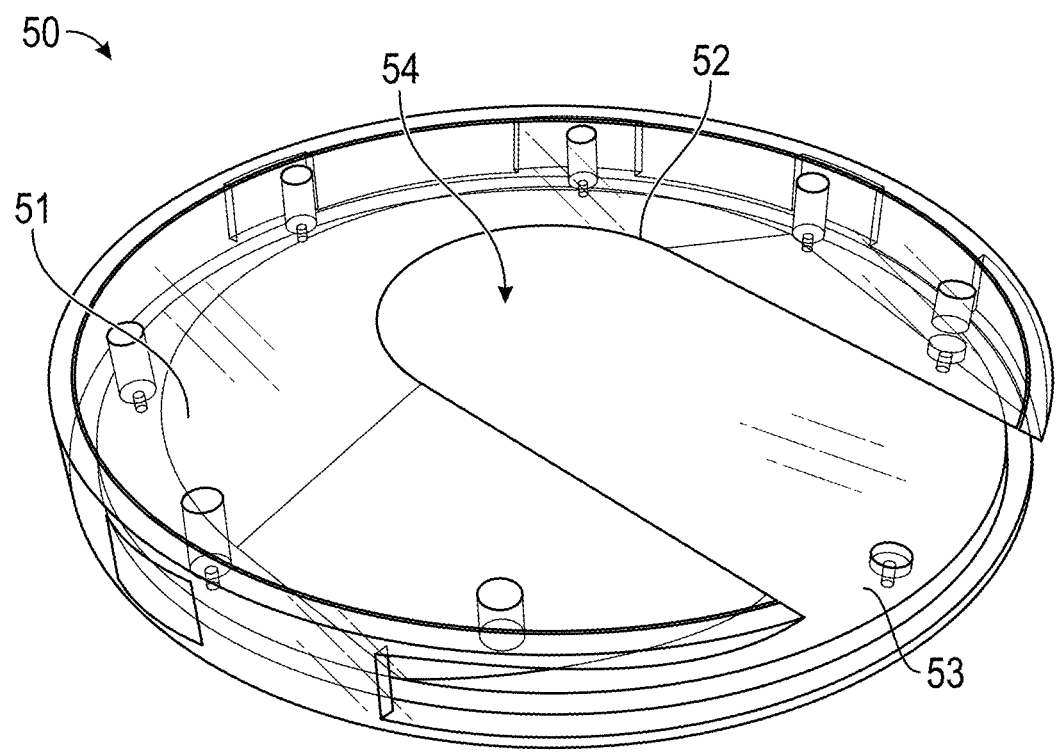
FIG. 7 is a top perspective view of a base plate of the holder assembly in FIG. 1.
Figure 8:
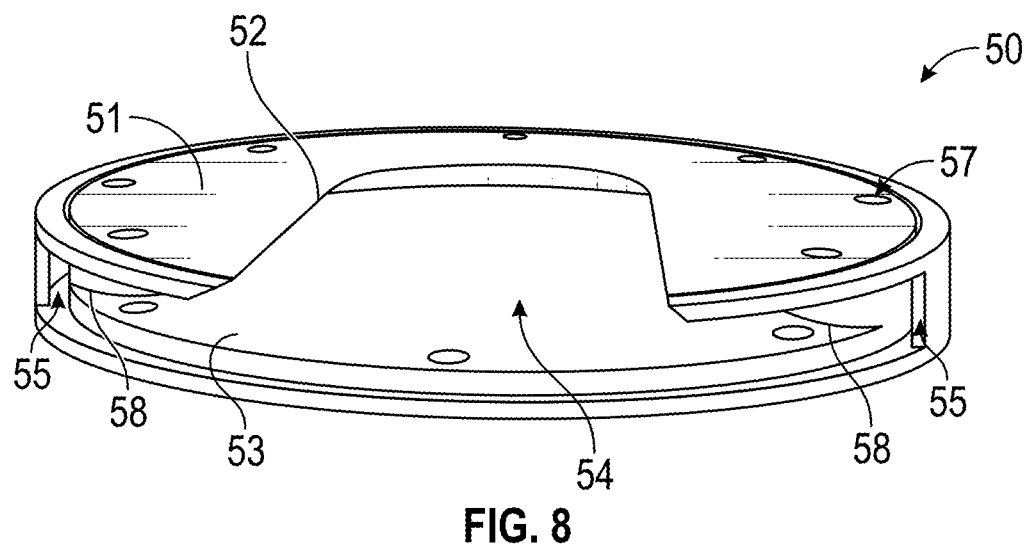
FIG. 8 is a top and front view of the base plate of FIG. 7.
Figure 9:
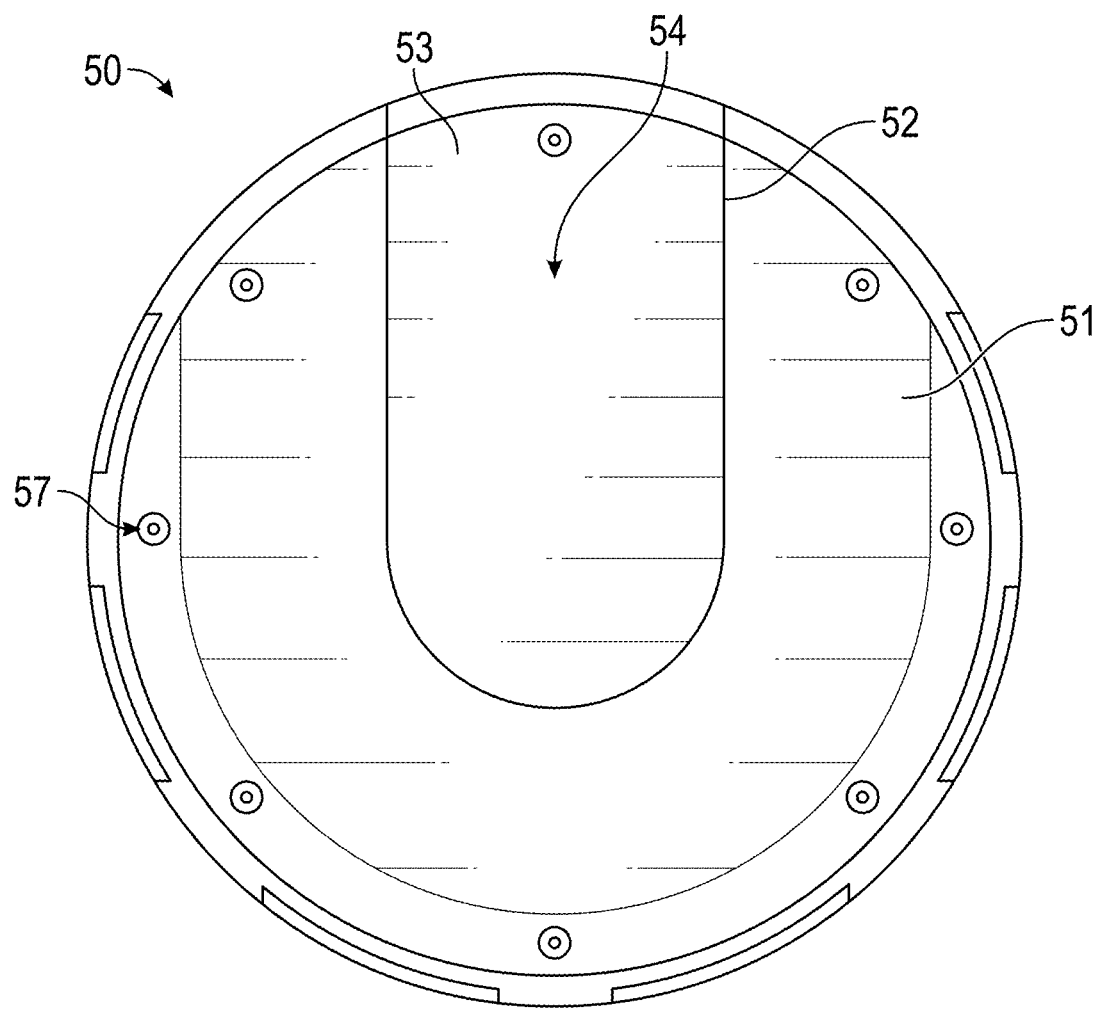
FIG. 9 is a top view of the base plate of FIG. 7.

In some implementations, the surface on which the holder assembly 100 is to be attached is not smooth and/or is not even. In such instances, the base plate 50 can be used to retain the vessel 10 on the surface. As shown on FIGS. 7-9, the base plate 50 has a top wall 51 spaced from a bottom wall 53 to define a slot 54 therebetween, and an opening 52 in the top wall 51. In one implementation, the opening 52 is U-shaped. The slot 54 of the base plate 50 can have angled side walls 58. The base plate 50 can also have a channel 55 near each angled side wall 58. In one implementation, the channel 55 can be a circumferential channel. The base plate 50 has one or more bores or apertures 57 (e.g., multiple bores/apertures 57) about at least a portion of the periphery of the base plate 50. The apertures 57 are sized to receive fasteners (e.g., screws) therethrough to fasten the base plate 50 to a surface (e.g., screw the base plate 50 to a surface, such as a rough or uneven surface).

The slot 54 is sized and shaped to receive the suction cup 8 of the housing 1 therein, where the edge of the opening 52 extends generally about a junction between the suction cup 8 and the vessel 10 and so the top wall 51 of the base plate 40 is proximate (e.g., next to, adjacent) the bottom surface 3 of the vessel 10 when the housing 1 (e.g., suction cup 8) is coupled to the base plate 50. The angled side walls 58 of the slot 54 can engage the upper angled surfaces of the suction cup 8 to thereby increase a surface area of the base plate 50 that engages with the suction cup (e.g., so that the contact between the base plate 50 and suction cup 8 is not limited to that around the edge of the opening 52).

Figure 10A:
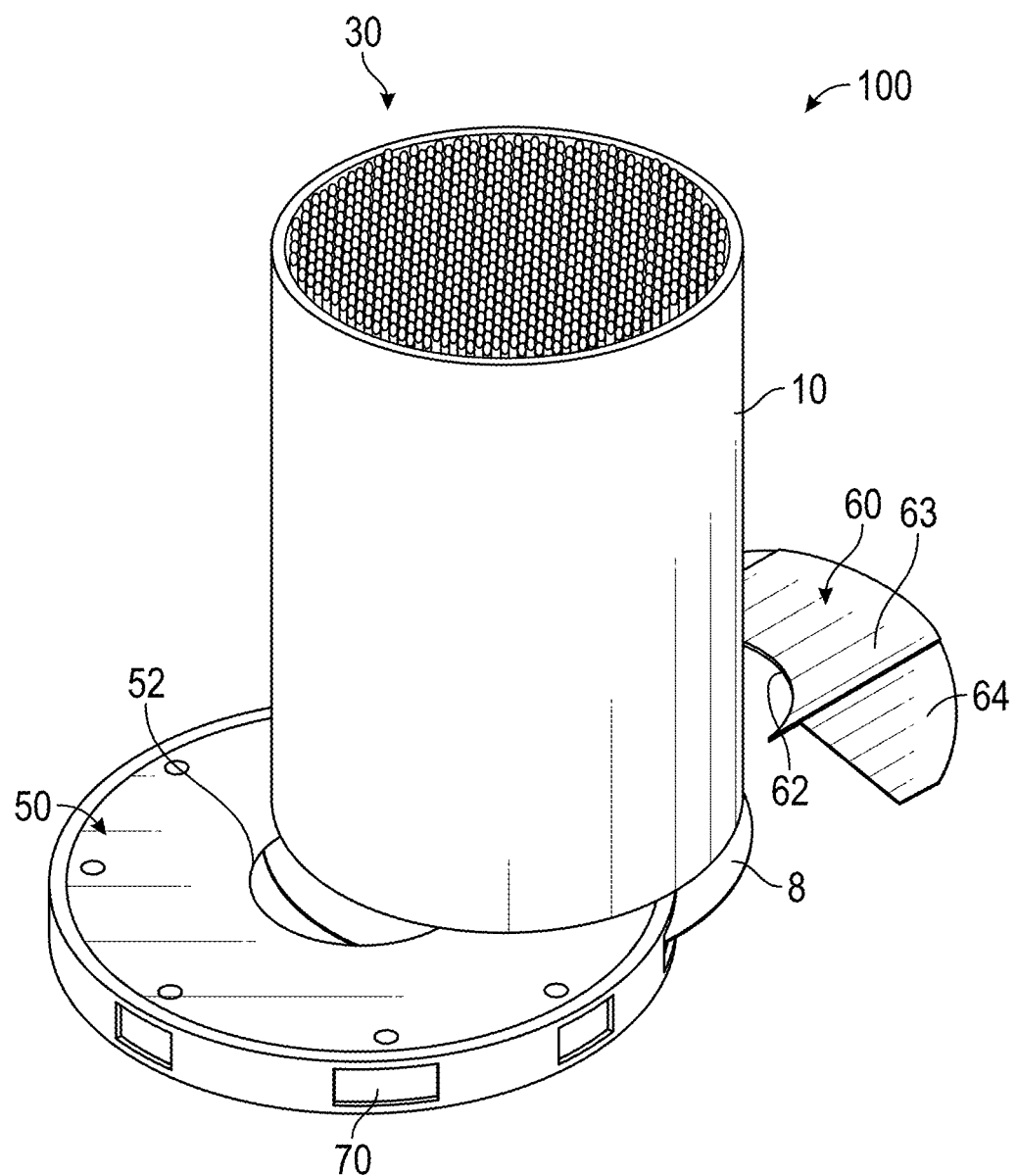
FIG. 10A shows a perspective view of one step in coupling the housing to the base plate.
Figure 10B:
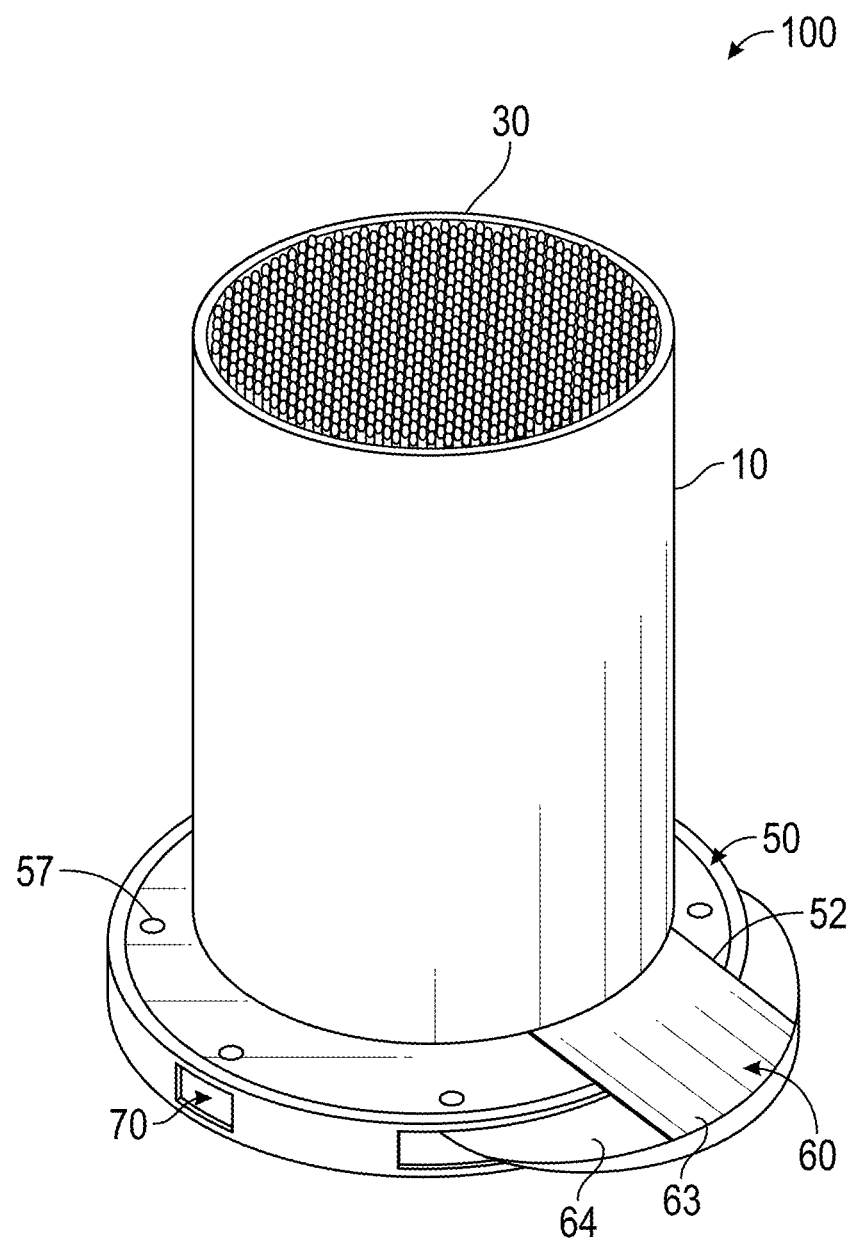
FIG. 10B shows a perspective view of another step in coupling the housing to the base plate.

The retention block 60 is sized and shaped for insertion into the slot 54 after the suction cup 8 has been inserted into the slot 54. The retention block 60 has an inner edge 62 that can extend at least partially about a joint between the suction cup 8 and the bottom wall 3 of the vessel 10 when the retention block 60 is seated inside the slot 54. In one implementation, the inner edge 62 can be curved. For example, the inner edge can be defined at least in part by a radius of curvature. The retention block 60 can have a top surface 63 and side surfaces 64 on either side of the top surface 63. The top surface 63 can be disposed proximate to (e.g., adjacent to, next to, facing or in contact with) the bottom wall 3 of the vessel 10 when the retention block 60 is seated inside the slot 54. As best shown in FIGS. 10B and 10F, the side surfaces 64 can be angled or taper outward from the top surface 63. The side surfaces 64 can be disposed proximate to (e.g., adjacent to, next to, facing or in contact with) the angled side walls 58 of the slot 54 when the retention block 60 is seated inside the slot 54. A bottom surface 65 of the retention block 60 can be disposed proximate to (e.g., adjacent to, next to, facing or in contact with) the bottom wall 53 of the slot 54 when the retention block 60 is seated inside the slot 54. Advantageously, the retention block 60 bears against a least a portion of the suction cup 8 when seated in the slot 54 to facilitate retention of the suction cup 8 in the slot 54 (e.g., inhibit or prevent the suction cup 8 from falling out of the slot 64 and thereby inhibit or prevent decoupling of the housing 1 from the base plate 50), thereby maintaining the coupling of the housing 1 to the base plate 50. Advantageously, the shape of the retention block 60, when inserted in the slot 54 contacts or otherwise bears against one or both of the bottom wall 3 of the vessel 10 and the angled surface of the suction cup 8 to maintain the vessel 10 securely coupled to the base plate 50 and inhibit (e.g., minimize, prevent) play between the housing 1 and the base plate 50.

Figure 10C:
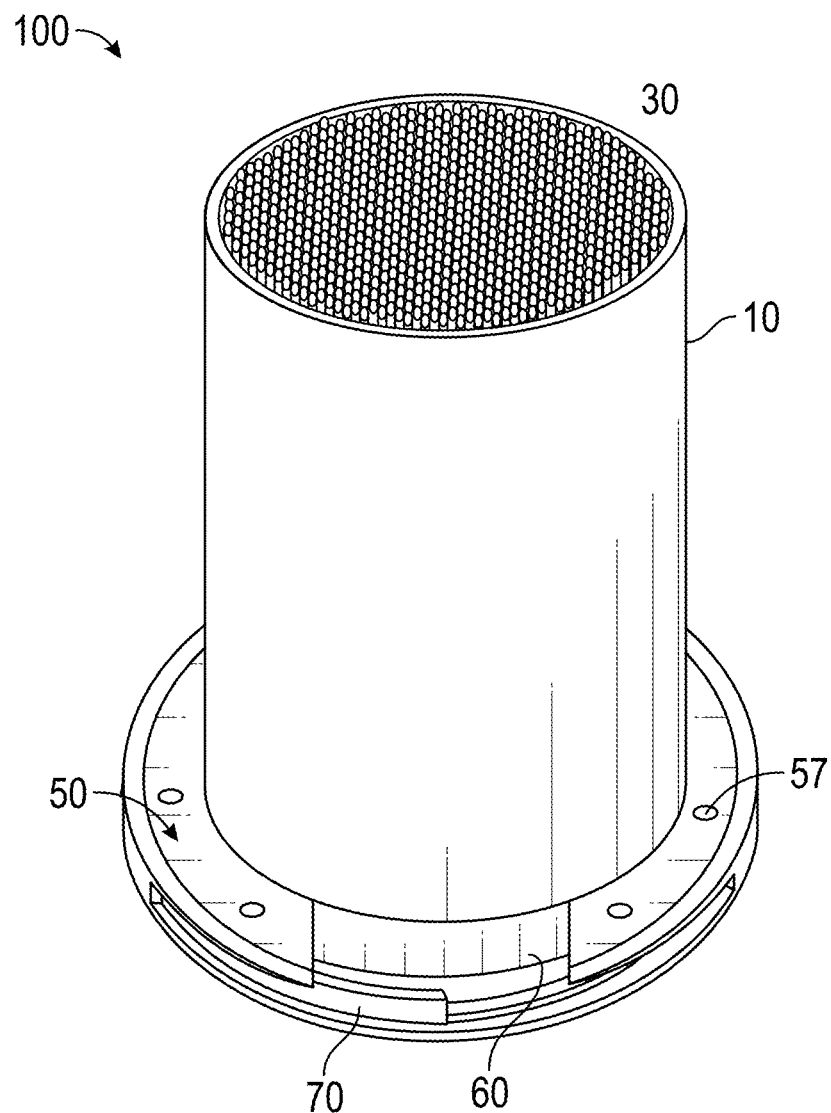
FIG. 10C shows a perspective view of another step in coupling the housing to the base plate.
Figure 10D:
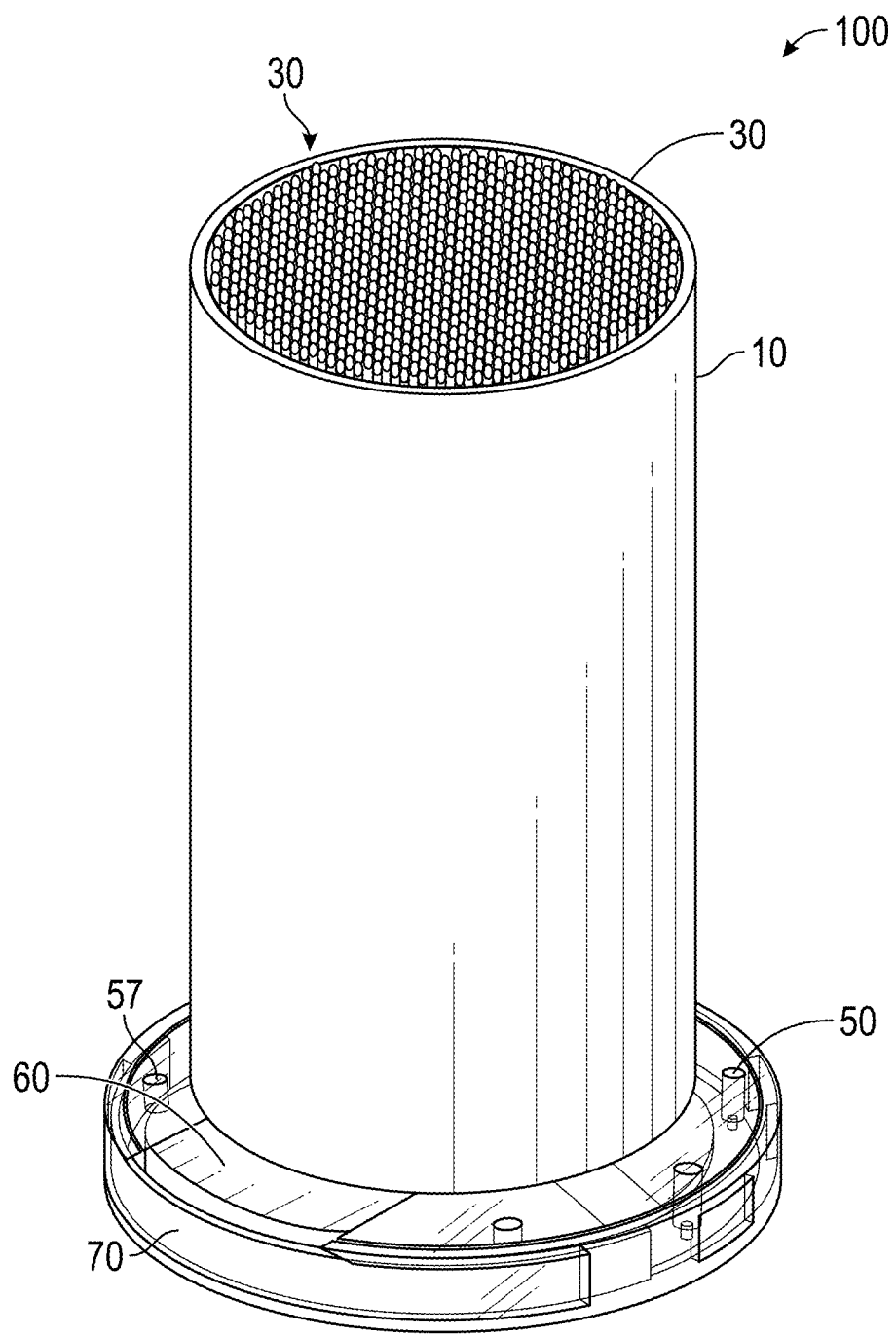
FIG. 10D shows a perspective view of another step in coupling the housing to the base plate.
Figure 10E:
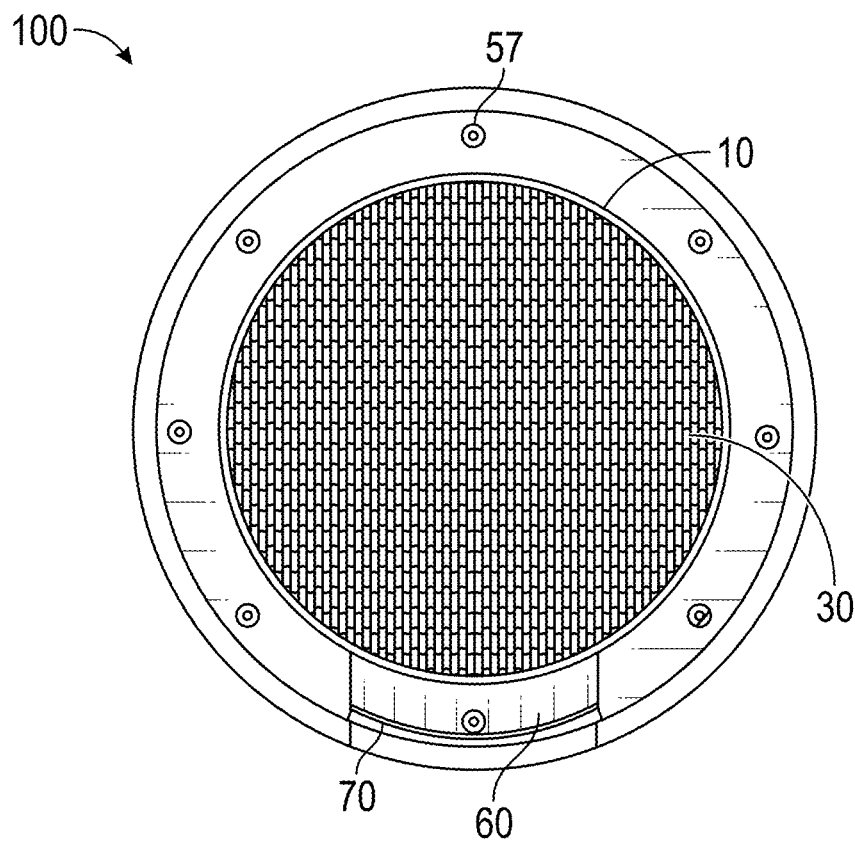
FIG. 10E shows a top view of the holder assembly once the housing has been coupled to the base plate.
Figure 10F:
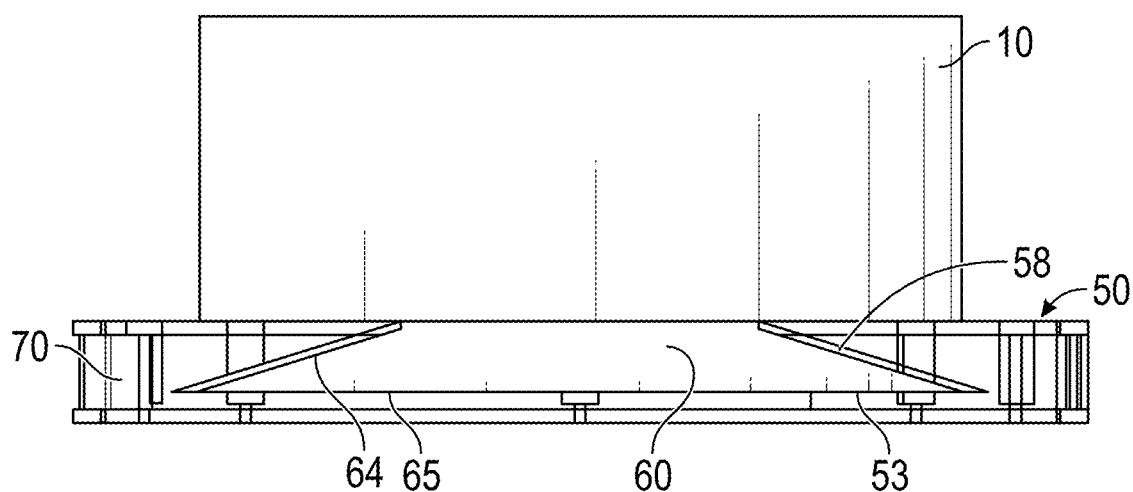
FIG. 10F shows a partial side view of the holder assembly once the housing has been coupled to the base plate.

With reference to FIGS. 1, 3, 10A-10F, the locking member 70 can be selectively moved to allow and disallow access to the slot 54 in the base plate 50. In one implementation, the locking member 70 is a curved wall that is movably coupled to the base plate 50. In one example the locking member 70 is slidable within the channel 55 of the based plate 50 (e.g., circumferentially slidable about at least a portion of a circumference of the base plate 50). With reference to FIG. 10B, the locking member 70 can be moved within the channel 55 (e.g., manually moved by a user, such as using their finger) to allow access to (e.g., not block) the slot 54 and/or opening 52. With the slot 54 and/or opening 52 unobstructed by the locking member 70, the suction cup 8 can be inserted (via the opening 52) into the slot 54 and the retention block 60 thereafter inserted into the slot 54 (e.g., to couple the housing 1 to the base plate 50), or alternatively to allow the retention block 60 and suction cup 8 to be removed from the slot 54 (e.g., to decouple the housing 1 from the base plate 50). The locking member 70 can be moved (e.g., slid) in front of the slot 54 and/or opening 52, as shown in FIGS. 10C-10D, to block the slot 54 and/or opening 52, thereby inhibiting (e.g., preventing) the removal of the retention block 60 and suction cup 8 from the slot 54 (e.g., to maintain the coupling of the housing 1 to the base plate 50).

Figure 11A:
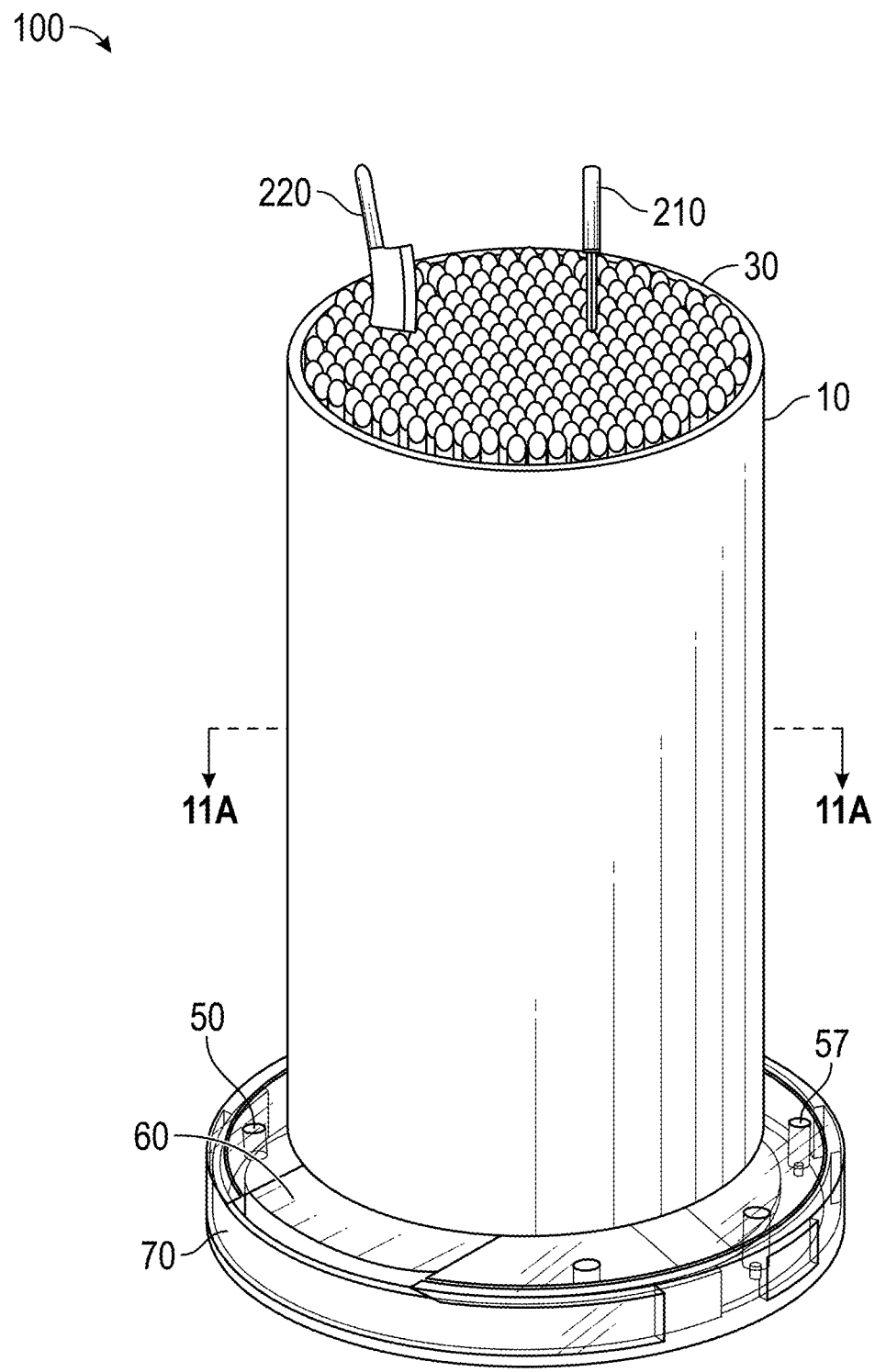
FIG. 11A shows a side view of the holder assembly with two knives inserted therein.
Figure 11B:
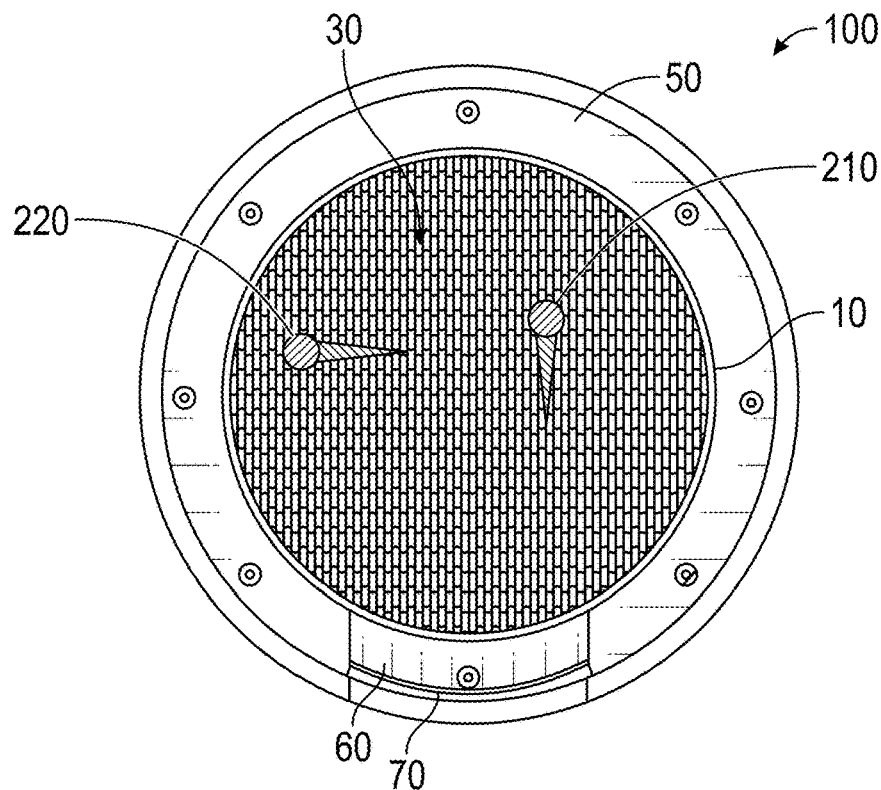
FIG. 11B shows a top view of the holder assembly in FIG. 11A.
Figure 11C:
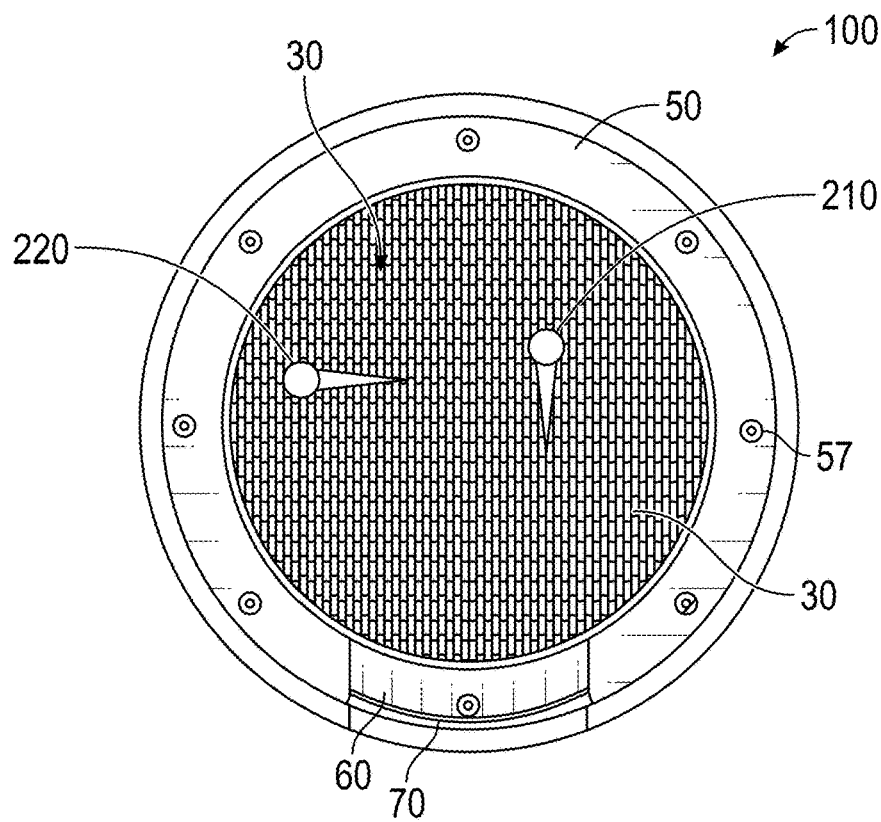
FIG. 11C shows a cross-sectional view of the holder assembly in FIG. 11A along line 11A-11A.

In use, the base plate 50 can be disposed on a desired surface (e.g., uneven surface, rough surface) and optionally coupled (e.g., screwed) to the surface (e.g., using fasteners, such as screws, inserted through the apertures 57). The housing 1 can then be coupled to the base plate 50 by inserting the suction cup 8 in the slot 54, inserting the retention block 60 in the slot 54 and against the suction cup 8, and moving the locking member 70 in front of the slot 54 (e.g., to at least partially, to completely, close the slot 54). The base plate 70 can be attached to a top surface (e.g., of a counter, work bench), a side surface (e.g., of a cabinet) or a bottom surface (e.g., of a cabinet) and the housing 1 attached to the base plate 50 in an upright position, a sideways position, or an upside down position, respectively. As discussed above, the bristles 30 advantageously retain one or more (e.g., multiple) knives or tools (e.g., brushes, screwdrivers) in place via a compression force exerted by the peripheral wall 11 of the vessel 10 onto the bristles 30, which in turn exert a compression force onto the knives or tools, and/or via a friction force between the side surfaces 35, 36 of the bristles 30 and knives or tools. The compression and/or friction force retain the knives or tools in place in the vessel 10 even if oriented upside-down. Advantageously, the more knives or tools are inserted into the vessel 10, the higher the compression force exerted by the peripheral wall 11 on the bristles 30 and in turn on the knives or tools, such that insertion of more knives or tools increases the retention forces (e.g., compression force, friction force) applied on the knives or tools, rather than decreasing it. FIGS. 11A-11C show views of two knives 210, 220 inserted into the chamber 6 in different orientations (e.g., generally perpendicular to each other). Knives or tools can be inserted in other orientations (e.g., diagonal relative to knives 210, 220). Advantageously, knives of tools can be inserted in any orientation in the chamber 6 and be retained in the holder assembly 100 by one or both of the compression force exerted by the peripheral wall 11 and the friction force exerted by the bristles 30 on the surface of the knives 210, 220.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A holder assembly for knives or tools, comprising:
  a housing comprising
    a vessel comprising an elastic material and having a chamber extending between an open end and a closed end, and
    a suction cup extending from an underside of the vessel below the closed end of the vessel;
  a bristle retaining tray disposed and retained in the chamber proximate the closed end of the vessel;
  a plurality of linear bristles disposed in the chamber, the plurality of linear bristles arranged within the chamber so that the plurality of linear bristles fill the chamber and so that the vessel exerts a compression force on the plurality of linear bristles, each bristle having a first end coupled to the bristle retaining tray, a second rounded end at or near the open end of the vessel, and a generally rectangular cross-section transverse to a length of the bristle;
  a base plate having a slot configured to removably receive the suction cup of the housing to at least partially couple the housing to the base plate;
  a retention block configured to fit in the slot and to engage one or both of an underside of the vessel and the suction cup; and
  a locking member coupled to the base plate and operable to retain the retention block in the slot of the base plate,
  wherein the plurality of linear bristles are configured to receive and retain one or more knives or tools via a friction force irrespective of the orientation of the one or more knives or tools when inserted between the bristles in the vessel and irrespective of an orientation of the housing.

2. The holder assembly of claim 1, wherein the first end of the bristles couple to the bristle retaining tray via an adhesive.

3. The holder assembly of claim 1, wherein the generally rectangular cross-section of the bristle has a width to depth ratio of between 2 to 1 and 3 to 1.

4. The holder assembly of claim 1, wherein the slot comprises a U-shaped opening configured to at least partially extend between the underside of the vessel and the suction cup when the vessel is coupled to the base plate.

5. The holder assembly of claim 1, wherein the locking member is slidably coupled to a channel of the base plate and configured to slide between a first position that exposes the slot of the base plate to allow insertion of the suction cup and retention block and a second position that closes the slot in the base plate to retain the suction cup of the housing and retention block in the slot.

6. The holder assembly of claim 1, wherein the housing is made of silicone.

7. The holder assembly of claim 1, wherein the housing has a generally cylindrical shape.

8. The holder assembly of claim 1, wherein the housing is a single piece.

9. The holder assembly of claim 1, wherein an inner diameter of the chamber of the housing, when empty, is smaller than an outer diameter of the bristle retaining tray and smaller than an effective outer diameter of the plurality of linear bristles, such that the housing exerts a compression force on the bristle retaining tray and the plurality of linear bristles.

10. The holder assembly of claim 1, wherein the retention block is tapered and configured to fit between the suction cup and an underside of the vessel of the housing.

11. A holder assembly for knives or tools, comprising:
  a housing comprising
    a vessel comprising an elastic material and having a chamber extending between an open end and a closed end, and
    a suction cup extending from an underside of the vessel below the closed end of the vessel;
  a plurality of linear bristles disposed in the chamber, the plurality of linear bristles arranged within the chamber so that the plurality of linear bristles fill the chamber and so that the vessel exerts a compression force on the plurality of linear bristles, each bristle having a generally rectangular cross-section transverse to a length of the bristle, and
  a base plate having a slot configured to removably receive the suction cup of the housing to at least partially couple the housing to the base plate,
  wherein the plurality of linear bristles are configured to receive and retain one or more knives or tools via a friction force irrespective of an orientation of the one or more knives or tools when inserted in the vessel and irrespective of an orientation of the housing.

12. The holder assembly of claim 11, further comprising a bristle retaining tray configured to be disposed and retained in the chamber proximate the closed end of the vessel, the bristle retaining tray configured to couple to a second end of the bristles.

13. The holder assembly of claim 11, further comprising a retention block configured to fit in the slot and to engage one or both of an underside of the vessel and the suction cup.

14. The holder assembly of claim 13, further comprising a locking member coupled to the base plate and operable to retain the retention block in the slot of the base plate.

15. The holder assembly of claim 14, wherein the locking member is slidably coupled in a channel of the base plate and configured to slide between a first position that exposes the slot of the base plate to allow insertion of the suction cup and retention block and a second position that closes the slot in the base plate to retain the suction cup of the housing and retention block in the slot.

16. The holder assembly of claim 11, wherein the generally rectangular cross-section of the bristle has a width to depth ratio of between 2 to 1 and 3 to 1.

17. The holder assembly of claim 11, wherein the housing is made of silicone.

18. The holder assembly of claim 11, wherein the housing has a generally cylindrical shape.

19. The holder assembly of claim 11, wherein the housing is a single piece.

20. The holder assembly of claim 11, wherein each of the plurality of bristles has a rounded end at or near the open end of the housing.

21. The holder assembly of claim 11, wherein the plurality of linear bristles are arranged in adjacent rows within the chamber.

\* \* \* \* \*